United States Patent
Zavaljevski (10) Patent No.: US 6,738,498 B1
(45) Date of Patent: May 18, 2004

(54) METHOD AND APPARATUS FOR TISSUE DEPENDENT FILTERING FOR IMAGE MAGNIFICATION

(75) Inventor: Aleksandar Zavaljevski, Waukesha, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 514 days.

(21) Appl. No.: 09/630,236

(22) Filed: Aug. 1, 2000

(51) Int. Cl.[7] .............................. G06K 9/00; G06K 9/32
(52) U.S. Cl. ..................... 382/128; 382/298; 382/300; 345/608; 345/609; 358/525
(58) Field of Search ................. 382/128–134, 382/298–300; 378/4; 345/606–610; 358/528, 525

(56) References Cited

U.S. PATENT DOCUMENTS

| | | | | |
|---|---|---|---|---|
| 5,235,432 A | * | 8/1993 | Creedon et al. ............ 358/479 |
| 5,847,714 A | * | 12/1998 | Naqvi et al. ................. 345/668 |
| 5,917,961 A | * | 6/1999 | Huonder ..................... 382/279 |
| 6,061,477 A | * | 5/2000 | Lohmeyer et al. .......... 382/300 |
| 6,101,234 A | * | 8/2000 | Ali et al. ....................... 378/4 |
| 6,101,235 A | * | 8/2000 | Zavaljevski et al. ........... 378/4 |
| 6,236,766 B1 | * | 5/2001 | Zavaljevski et al. ........ 382/300 |
| 6,501,818 B1 | * | 12/2002 | Ali et al. ....................... 378/4 |
| 6,542,242 B1 | * | 4/2003 | Yost et al. .................. 356/450 |

* cited by examiner

*Primary Examiner*—Jayanti K. Patel
*Assistant Examiner*—Aaron Carter
(74) *Attorney, Agent, or Firm*—McAndrews, Held & Malloy, Ltd.; Peter J. Vogel; Michael A. Dellapenna

(57) ABSTRACT

A method and apparatus for tissue dependent filtering for digital image magnification includes using bilinear interpolation and digital convolution filters to approximate bicubic interpolation for digital image magnification. A library of sets of representative images may be created for particular anatomies and particular imaging modalities. Two-dimensional convolution filter coefficients may be estimated using a set of representative images chosen for a particular anatomy. The two-dimensional convolution filter coefficients may be employed to form a two-dimensional convolution filter to be used with bilinear interpolation to magnify a digital image.

24 Claims, 6 Drawing Sheets

METHOD AND APPARATUS FOR TISSUE DEPENDENT FILTERING FOR IMAGE MAGNIFICATION

CROSS REFERENCE TO RELATED APPLICATIONS (if applicable)

Not applicable.

STATEMENT REGARDING FEDERALLY SPONSORED RESEARCH & DEVELOPMENT (if applicable)

Not applicable.

BACKGROUND OF THE INVENTION

The preferred embodiments of the present invention generally relate to digital image magnification, and in particular relate to a method and apparatus for tissue dependent filtering for digital image magnification.

Doctors and technicians have at their disposal a wide range of ultrasound, x-ray, nuclear, and other medical diagnostic imaging systems with which to examine patients. The capabilities of these medical diagnostic imaging systems have increased dramatically since their introduction. Spurred on by the development of inexpensive but very sophisticated, powerful, and fast processing circuitry, designers of medical diagnostic imaging systems continue to add and enhance a wide range of device functions for medical diagnostic imaging systems. Thus, for example, an x-ray imaging system may include magnification, 2D or 3D imaging, Doppler overlay, Colorflow scans, image frame recording and playback capabilities, image annotation and archiving, panning, and the like.

Medical diagnostic imaging systems, such as x-ray imaging systems, have long been accepted medical diagnostic tools. For instance, x-ray imaging systems are commonly used to capture, as examples, thoracic, cervical, spinal, cranial, and abdominal images that often include information necessary for a doctor to make an accurate diagnosis. X-ray imaging systems typically include an x-ray source and an x-ray sensor. When having a thoracic x-ray image taken, for example, a patient stands with his or her chest against the x-ray sensor as an x-ray technologist positions the x-ray sensor and the x-ray source at an appropriate height. X-rays produced by the source travel through the patient's chest, and the x-ray sensor then detects the x-ray energy generated by the source and attenuated to various degrees by different parts of the body. An associated control system obtains the detected x-ray energy from the x-ray sensor and prepares a corresponding diagnostic image on a display.

The x-ray sensor may be a conventional screen/film configuration, in which the screen converts the x-rays to light that exposes the film. The x-ray sensor may also be a solid state digital image detector. Digital detectors afford a significantly greater dynamic range than conventional screen/film configurations, typically as much as two to three times greater.

Medical diagnostic images may be used for many purposes. For instance, internal defects in a target object may be detected. Additionally, changes in internal structure or alignment may be determined. Furthermore, the image may show the presence or absence of objects in the target.

For a variety of purposes, it may be desirable to magnify at least portions of medical diagnostic images. Slight defects or small objects in a patient's body may be examined more closely in a magnified digital image. Magnification of a digital image may be achieved by modifying pixels or picture elements that comprise the digital image. Several techniques may be used to magnify a digital image, such as pixel replication and interpolation. Pixel replication simply copies the pixels of a digital image to enlarge a digital image without adjusting the resolution of the digital image. Pixel replication results in a low quality magnified digital image. Interpolation resizes the image and adjusts the resolution based on individual pixel data values and relationships between the pixel data values. Using interpolation, each pixel from the original digital image is divided into multiple new pixels. The data values assigned to the new pixels are based upon relationships between surrounding original pixel data values. Methods of interpolation include nearest neighbor interpolation and bilinear interpolation.

Nearest neighbor interpolation is a fast technique and uses relationships between the new pixel and an original adjacent pixel. However, nearest neighbor interpolation may produce a "stair stepped" effect around diagonal lines and curves in the digital image. Bilinear interpolation uses four original pixels. Bilinear interpolation may produce a smoother, more accurate image than nearest neighbor. However, while bilinear interpolation may smooth the edges of objects in the digital image, it may obscure some extreme data values in the digital image. Some high quality magnification methods, such as bicubic interpolation, are more accurate magnification methods. However, high quality magnification methods, such as bicubic interpolation, have not heretofore been included in graphic software that is useful with medical diagnostic imaging systems. Bicubic interpolation calculates a new pixel value using sixteen original pixel values. Bicubic interpolation is typically very computationally expensive.

There is a need to provide high quality techniques for digital image magnification for multiple medical diagnostic imaging systems. There is also a need for high quality magnification methods that adapt to the content of the digital images to be magnified. There is also a need for high quality magnification methods that may be easily and repeatedly used for a variety of images.

Thus, a need exists for a method and apparatus for tissue dependent filtering for digital image magnification.

BRIEF SUMMARY OF THE INVENTION

A preferred embodiment of the present invention provides a method and apparatus for tissue dependent filtering for digital image magnification. The method and apparatus alter the spatial characteristics of digital images to magnify at least a portion of a digital image. A library is created with sets of representative images for particular anatomies using particular imaging modalities. Two-dimensional convolution filter coefficients are estimated using the sets of representative images. Using a set of representative images for a particular anatomy, a function is formed which represents the mean square difference between pixel values obtained using bicubic interpolation and pixel values obtained using a preferred embodiment. The function is then minimized using a simulated annealing method. The coefficients in the global minimum of the function constitute the convolution filter coefficients for the particular anatomy at a particular magnification value.

The method and apparatus use bilinear interpolation and convolution filters to approximate bicubic interpolation for digital image magnification. First, the method and apparatus apply bilinear interpolation to the digital image. Then, a set of representative convolution filter coefficients is selected for the digital image. A two-dimensional convolution filter is applied to the digital image. The two-dimensional convolution filter is based on the convolution filter coefficients calculated from the set of representative images.

DETAILED DESCRIPTION OF THE INVENTION

Figure 1:
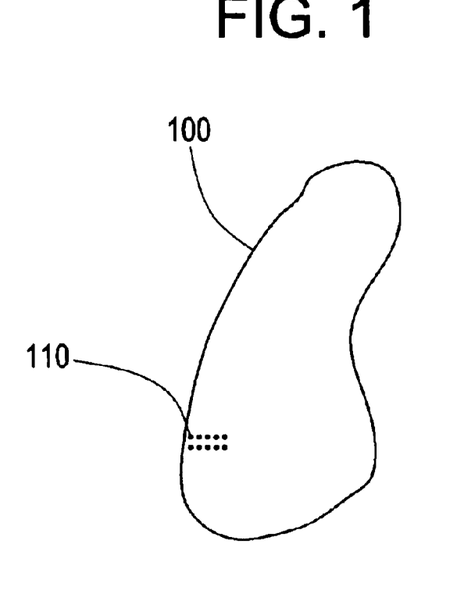
FIG. 1 illustrates a representation of a digital image.
Figure 2:
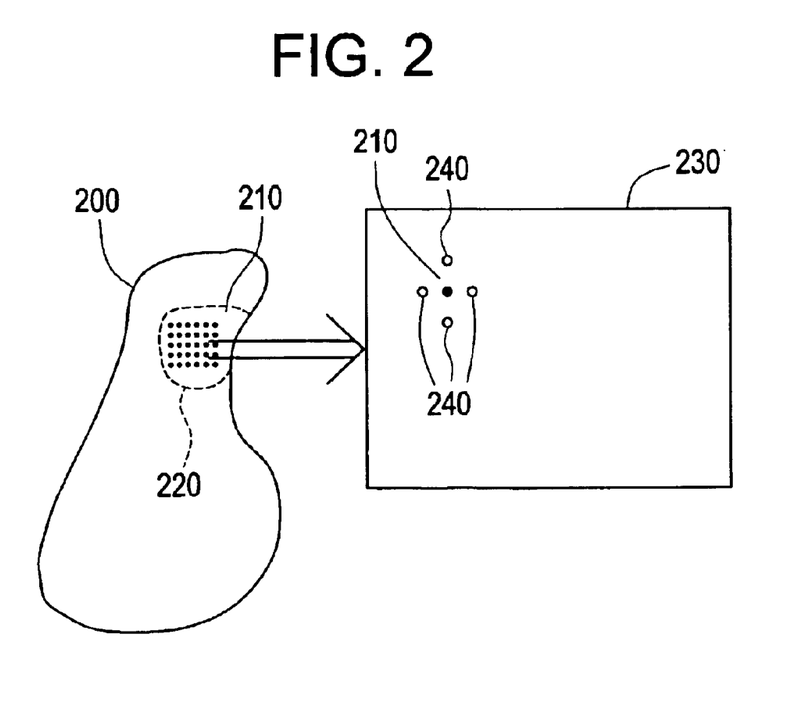
FIG. 2 illustrates a representation of a magnified digital image.

FIG. 1 illustrates a digital image 100. A digital image 100 represents a physical object, such as a portion of a human anatomy (i.e. heart, lung, etc.). A digital image is comprised of picture elements, known as pixels 110. A digital image 100 may be magnified by modifying the pixels 110 in the digital image 100. FIG. 2 illustrates a digital image 200 having a portion 220 comprised of pixels 210. The portion 220 is enlarged to form a magnified digital image 230. The digital image 200 may be magnified by selecting at least a portion 220 of the digital image 200 and replicating the pixels 210 to form new pixels 240. The values of the new pixels 240 are obtained from the values of the original pixels 210.

Figure 3A:
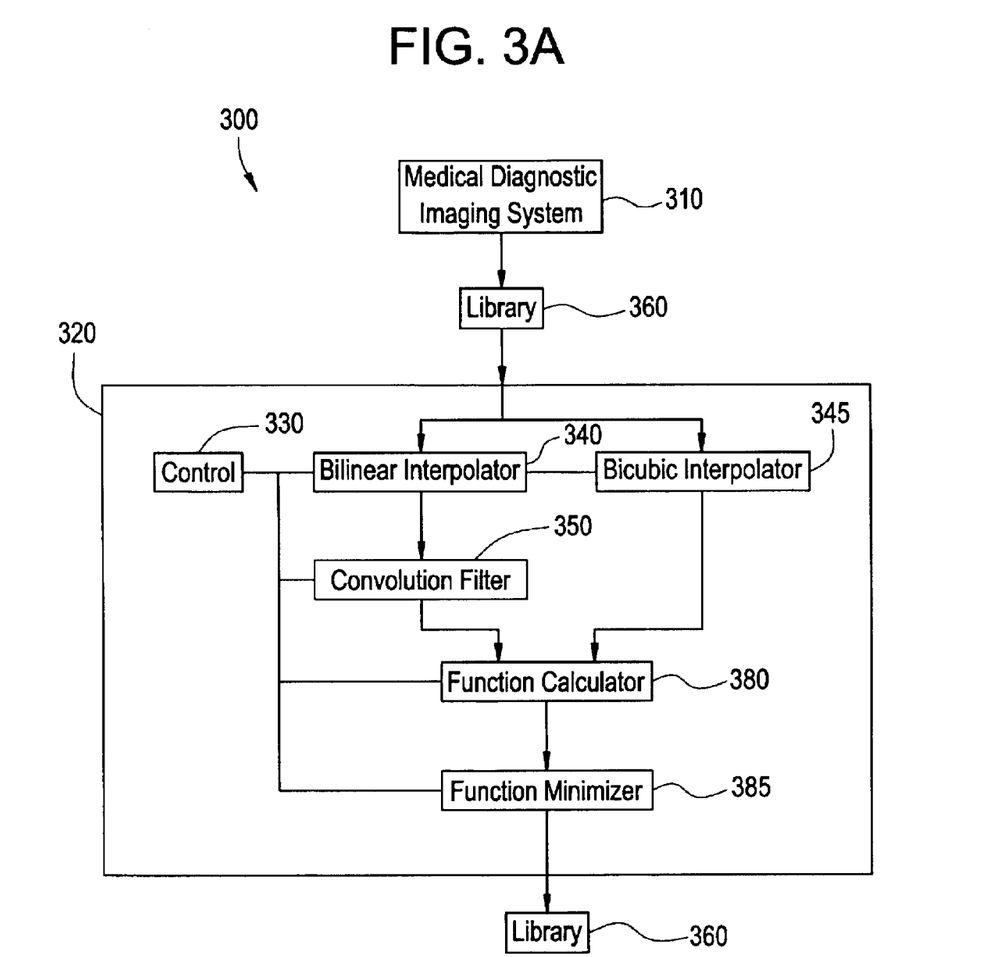
FIGS. 3a and 3b illustrate a tissue dependent filtering system for image magnification used in connection with a preferred embodiment of the present invention.
Figure 3B:
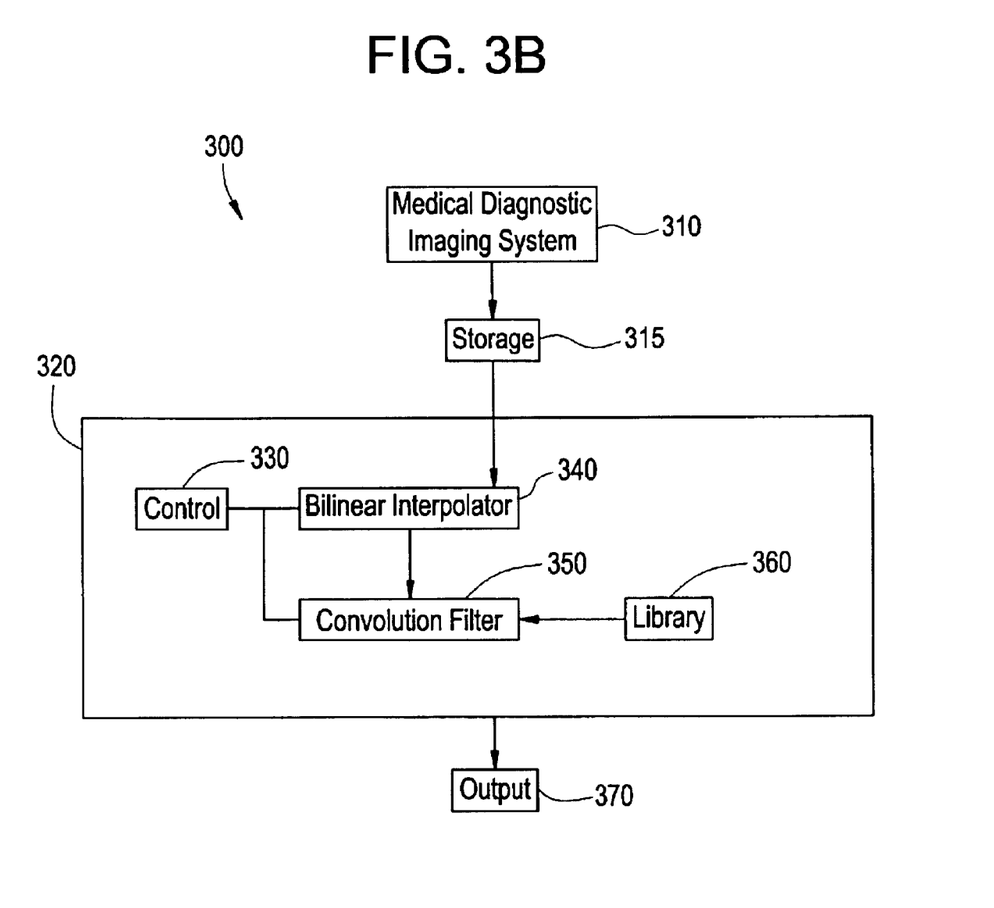

FIG. 3a and FIG. 3b illustrate a preferred embodiment of a tissue dependent filtering system 300 for image magnification. FIG. 3a illustrates a preferred embodiment of a system for estimating convolution filter coefficients. FIG. 3b illustrates a preferred embodiment of a system for image magnification using estimated convolution filter coefficients. The tissue dependent filtering system 300 includes a plurality of subsystems. The tissue dependent filtering system 300 includes subsystems, such as a medical diagnostic imaging system 310 and an image magnifier 320. A preferred embodiment includes storage 315 for storing a digital image 200. The image magnifier 320 comprises a control unit 330, a bilinear interpolator 340, and a convolution filter 350. A memory 325 stores at least a portion 220 of the digital image 200 during image magnification. A library 360 comprises sets of representative images for particular anatomies and particular imaging modalities that are used for image magnification.

The library 360 comprises sets of representative images for particular anatomies, such as brain, heart, knee, elbow, lung, etc. The images are digital images 200 with pixel 210 values. Each anatomy in the library 360 has sets of representative images for particular imaging modalities, such as x-ray, MR, CT, etc. Sets of representative digital images of the particular anatomies are taken with a variety of particular imaging modalities on medical diagnostic imaging systems 310. The sets of representative digital images are then stored in the library 360 for future use with the preferred embodiments.

The tissue dependent filtering system 300 determines convolution filter coefficients and then magnifies an image using the convolution filter coefficients. In a preferred embodiment, image magnification may be performed following the determination of convolution filter coefficients or at a later time. Convolution filter coefficients are determined for particular anatomies for particular magnification values. In a preferred embodiment, the convolution filter coefficients are estimated using the library 360 of representative digital images 200. Estimated convolution filter coefficients may be calculated using the pixel values 210, 240 of the representative digital images 200. In order to estimate the convolution filter coefficients, a function of convolution coefficients, pixel values, and conventional bicubic interpolation values is formed in the function calculator 380. In a preferred embodiment, the function represents the sum of squares of differences between conventional bicubic interpolation and a preferred embodiment. The bicubic interpolator 345 calculates conventional bicubic interpolation. The bilinear interpolator 340 with the convolution filter 350 calculates a preferred embodiment. Particular functions are formed for particular magnification values, as well as for particular anatomies and modalities. The function is minimized in the function minimizer 385. The convolution filter coefficients are taken from the minimum of the function.

In a preferred embodiment, the above calculations may be performed by the control unit 330. In a preferred embodiment, the above calculations may be performed prior to image magnification. In a preferred embodiment, the above calculations may be performed independent of an image magnification. The convolution filter coefficients are stored in the library 360. The coefficients may be retrieved and used for image magnification in a medical diagnostic imaging system 310.

The medical diagnostic imaging system 310 generates a digital image 200. In a preferred embodiment, the digital image 200 may be stored in storage 315. In a preferred embodiment, the image magnifier 320 may receive the digital image 200 from the storage 315. In an alternative embodiment, the image magnifier 320 may receive the digital image 200 from the medical diagnostic imaging system 310. In a preferred embodiment, the image magnifier 320 may store the digital image 200 in memory 325. The memory 325 may be used to store the digital image 200 as the digital image 200 is magnified in the image magnifier 320.

The digital image 200 is first modified by the bilinear interpolator 340. The control unit 330 selects at least a portion 220 of the digital image 200 that is to be magnified. The bilinear interpolator 340 applies bilinear interpolation to the pixels 210 of the portion 220 of the digital image 200. Bilinear interpolation of the digital image 200 by the bilinear interpolator 340 produces a magnified digital image 230.

Then the convolution filter 350 modifies the magnified digital image 230. The control unit 330 selects from the library 360 a set of representative convolution filter coefficients for a particular anatomy comprising the digital image 200, 230. In a preferred embodiment, a medical diagnostic technician instructs the control unit 330 to select a set of representative convolution filter coefficients from the library 360 based on an inputted anatomy and modality and magnification.

The convolution filter 350 uses the estimated convolution filter coefficients for the set of representative images. The convolution filter 350 applies a convolution filter based on the convolution filter coefficients from the library 360 to the magnified digital image 230. In a preferred embodiment, the convolution filter is a two-dimensional convolution filter.

The convolution filter improves the quality of the magnified digital image 230. The convolution filter may "smooth" the magnified digital image 230.

In a preferred embodiment, the high quality magnified digital image 230 is sent to an output 370. In a preferred embodiment, the output 370 may represent a digital display. In another embodiment, the output 370 may represent a storage, such as memory.

Figure 4:
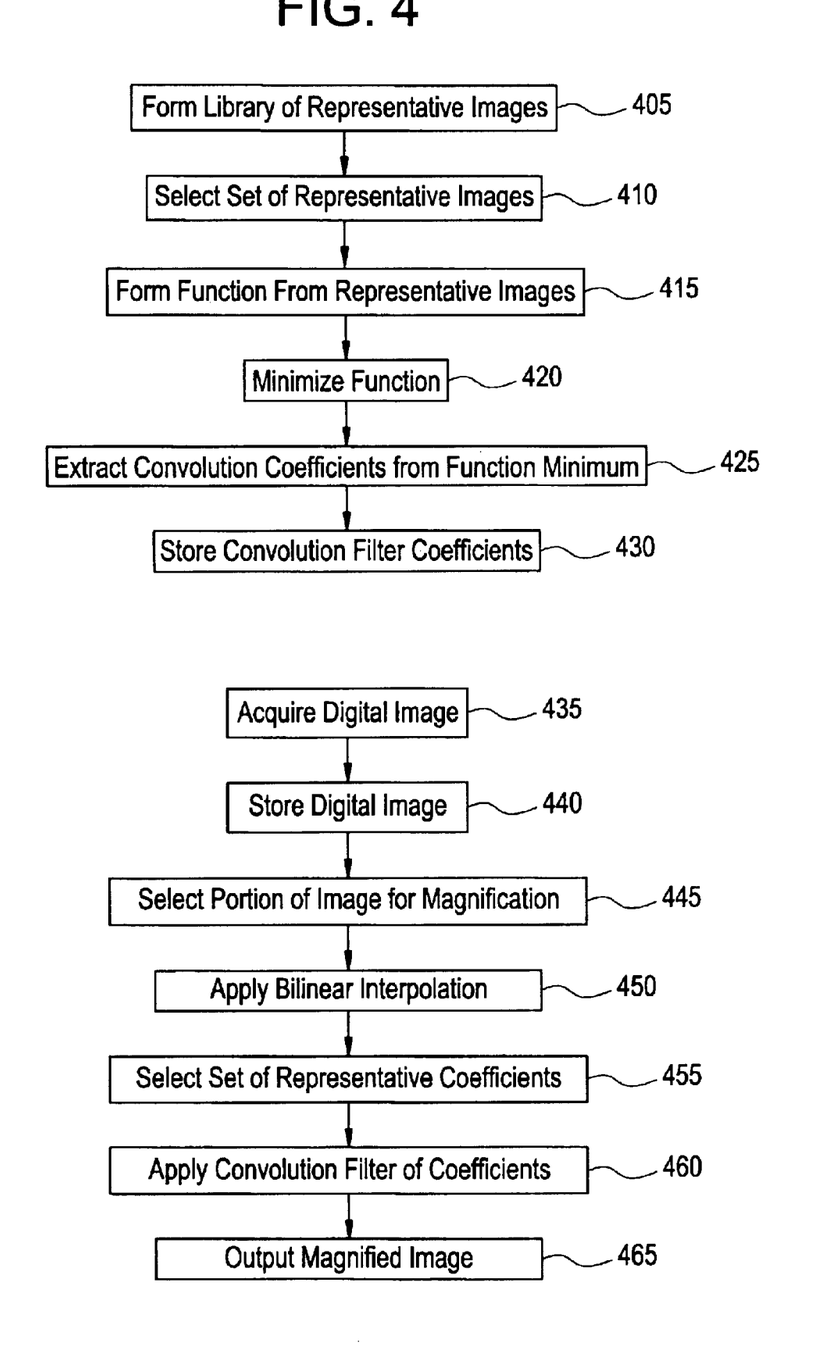
FIG. 4 illustrates a flow diagram of a preferred embodiment for tissue dependent filtering for image magnification.

FIG. 4 illustrates a flow diagram for a preferred embodiment for tissue dependent filtering for image magnification. In step 405, a library is formed of at least one set of representative digital images 200. The library comprises at least one set of digital images 200 representative of particular anatomies with particular imaging modalities. In step 410, a set of representative images 200 is selected to estimate convolution filter coefficients associated with the set of representative images 200.

In step 415, a function is formed based on data from the set of representative digital images 200. In a preferred embodiment, the function represents the difference between pixel values obtained by a preferred method of convolution coefficients and conventional bicubic interpolation values. In step 420, in a preferred embodiment, the convolution filter function is minimized. In a preferred embodiment, the set of representative digital images 200 is magnified through conventional bicubic interpolation, and the function tries to minimize the difference between the bicubic interpolation values and the bilinear interpolation values by determining a set of convolution filter coefficients to be used with the bilinear interpolation. In a preferred embodiment, the mathematical method of simulated annealing may be used to minimize the convolution filter function. Simulated annealing uses the probability of changing from one "state" to another "state" to calculate the global minimum of the function. In step 425, the convolution filter coefficients are extracted from the global minimum of the function. In a preferred embodiment, in step 430, the convolution filter coefficients are stored in the library 360.

In step 435, a digital image 200 is acquired from a medical diagnostic imaging system 310. In a preferred embodiment, the digital image 200 may be stored in a storage 315, such as in memory, in step 440. In step 445, at least a portion 220 of the digital image 200 is identified for magnification. In step 450, bilinear interpolation is applied to the portion 220 of the digital image 200 that is to be magnified. Bilinear interpolation utilizes the values from four pixels 210 in the original digital image to produce a magnified pixel value 240. Bilinear interpolation produces a magnified digital image 230. The magnified digital image 230 may be a blurred image, however.

In step 455, the convolution filter coefficients associated with the particular anatomy are selected. In step 460, a convolution filter of convolution filter coefficients is applied to the magnified digital image 230. In a preferred embodiment, the convolution filter is a two-dimensional convolution filter. Applying the convolution filter to the magnified digital image 230 improves the quality of the magnified digital image 230. In step 465, the high quality magnified digital image 230 is output. In a preferred embodiment, the output 370 may represent a digital display. In an alternative embodiment, the output 370 may represent a storage, such as memory.

In an example of a preferred embodiment, a set of convolution filter coefficients $a_{ij}$ (i,j=1, . . . , m) for an m by m convolution filter is calculated that is best suited for a particular anatomy, such as a head, abdomen, knee, etc., and an imaging modality, such as MR, CT, X-ray, etc. In order to calculate the set of coefficients $a_{ij}$, a set of representative images is selected. A function F(A) represents the difference between magnified image pixels 240 obtained by a preferred embodiment $$\left(\sum_{k=1}^{m}\sum_{l=1}^{m}a_{kl}b_{ijkl}\right)$$

and bicubic interpolation values $$\left(\sum_{k=1}^{4}\sum_{l=1}^{4}c_{jk}I_{ijkl}\right)$$

from the set of representative images. The function F(A) is calculated using the following equation:

$$F(A) = \sum_{i=1}^{p}\left(\sum_{j=1}^{p}\left(\sum_{k=1}^{m}\sum_{l=1}^{m}a_{kl}b_{ijkl} - \sum_{k=1}^{4}\sum_{l=1}^{4}c_{jk}I_{ijkl}\right)^{2}\right), \quad (1)$$

where A is a matrix of convolution filter coefficients $a_{ij}$ (i,j,=1, . . . , m); p is a number of images in the representative set of images for a particular anatomy; q is a number of pixels in a particular image; $b_{ijkl}$ are bilinearly interpolated values of the representative images in the set; $I_{ijkl}$ are the image pixel values of the representative images in the set; and $c_{kl}$ are coefficients derived from expressions for bicubic interpolation for magnification by n for a particular output pixel position. The bicubic interpolation values are obtained by conventional bicubic interpolation methods.

Next, the minimum of the function F(A) may be found. The set of arguments A of the function F(A) represents the coefficients of the convolution filter that may be applied to the digital image 230. The minimum of the function F(A) may be determined in a preferred embodiment using a simulated annealing method. Annealing is the process of very slow cooling of crystalline substances in order to "freeze" them in a state of minimal energy. Simulated annealing simulates the slow cooling process.

Simulated annealing may be described mathematically using inhomogeneous Markov chains. Movement of an inhomogeneous Markov chain from one time period to another time period is governed by transition probabilities of the chain. In the Metropolis-Hastings algorithm for simulated annealing, each step of a Markov chain may be broken into two stages, a proposal stage and an acceptance stage. If the chain is currently in stage $A_i$, then in the proposal stage a new destination stage $A_j$ is proposed. In the acceptance stage, a random number is drawn uniformly from [0,1] to determine whether the proposed step is actually taken or the chain remains in place. In simulated annealing the acceptance probabilities may not be constant. In simulated annealing the acceptance probabilities may depend on a parameter called temperature. The temperature parameter may be slowly reduced to simulate the annealing process. Slowly reducing the temperate parameter in simulated annealing may enable more efficient sampling of a coefficient space. Slowly reducing the temperature parameter in simulated annealing may increase chances of obtaining a global minimum for function F(A).

For example, suppose {T(k)} is a "temperature" sequence of positive numbers. Also, suppose $Q(A_i,A_j)$ is a stationary transition probability from $A_i$ to $A_j$ in the space of coefficients A. A one-step transition probability P at a time k for a finite-state Metropolis-type annealing chain $\{A^k\}$ may be represented by the following equations:

$$P\{A^{k+1} = A_j \mid A^k = A_i\} = Q(A_i, A_j)p^k(A_i, A_j), \; i \neq j \quad (2)$$

$$P\{A^{k+1} = A_i \mid A^k = A_i\} = 1 - \sum_{i \neq j} Q(A_i, A_j)p^k(A_i, A_j), \quad (3)$$

where $$p^k(A_i, A_j) = \exp\left(-\frac{[F(A_i) - F(A_i)]}{T(k)}\right). \quad (4)$$

Probability $p^k(A_i,A_j)$ represents an acceptance probability based on chances of obtaining a new state with "energy" $F(A_j)$ relative to a previous state with "energy" $F(A_i)$. $Q(A_i,A_j)$ represents a probability density of a state space of coefficients.

For simulated annealing, the space of coefficients to be searched may be discretized. For example, the space $q(A_i, A_j)$ may be represented by the following equation:

$$q^k(x_j - x_i) = (2\pi T(k))^{-d/2} \exp[-(x_j - x_i)^2/(2T(k))], \quad (5)$$

where d is a number of filter coefficients in A.

The inhomogeneous Markov chain may be interpreted as follows. For example, the current state may be $A^k = A_i$. Then, a candidate state may be generated with probability $Q(A_i, A_j)$. If $p^k(A_i,A_j) > u_k$, where $u_k$ is an independent random variable uniform on [0,1], then the next state may be $A^{k+1} = A_j$. Otherwise, state $A^{k+1}$ may be set to $A_i$.

For a finite state annealing method, a preferred temperature schedule that may ensure convergence to minimum states is given by:

$$T(k) = \frac{T_0}{\log(k)}, \quad (6)$$

where $T_0$ may be sufficiently large to escape local minima.

The annealing method may be applied to calculate the global minimum of the function F(A). The filter coefficients A may be obtained as function F(A) arguments at the minimum point. The coefficients A of the convolution filter are stored.

Figure 5:
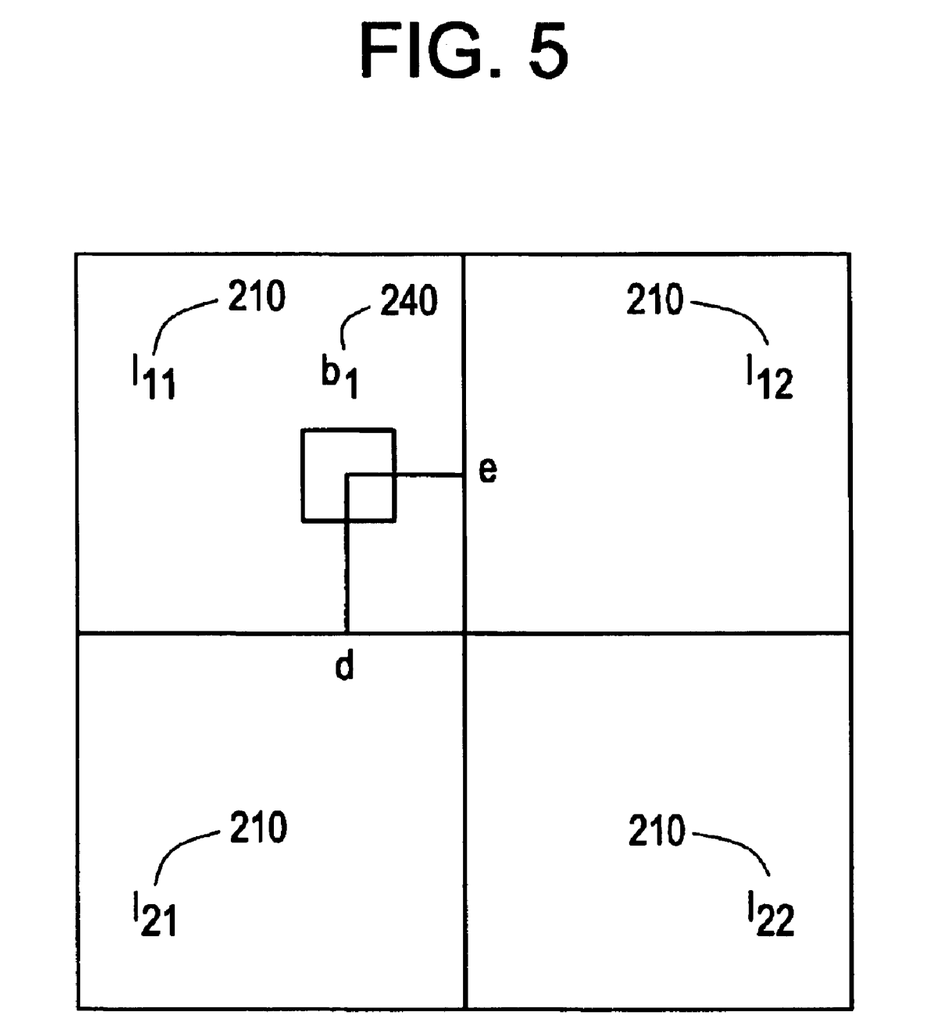
FIG. 5 illustrates the relative position of original and magnified pixels through bilinear interpolation.

In an example of a preferred embodiment, a digital image 200 is acquired from a medical diagnostic imaging system 310. Bilinear interpolation is applied to the digital image 200. FIG. 5 illustrates relative positions of original digital image pixels 210, $I_{ij}$, and bilinearly interpolated pixels 240, $b_{ij}$. To magnify the pixels 210 of the digital image 200 by a factor of n, the values of new pixels 240, $b_{ij}$, with respect to the pixel values 210, $I_{kl}$, of the original digital image 200 are given by the following equation:

$$b_{ij} = \frac{(n/2+d)(n/2+e)}{n^2}I_{11} + \frac{(n/2-d)(n/2+e)}{n^2}I_{12} + \frac{(n/2+d)(n/2-e)}{n^2}I_{21} + \frac{(n/2-d)(n/2-e)}{n^2}I_{22}. \quad (7)$$

Then, a two-dimensional convolution filter is applied to the digital image 200. The two-dimensional convolution filter combines the bilinearly interpolated values with the convolution filter coefficients associated with a set of representative images for a particular anatomy to form a value for the magnified digital image 230. The two-dimensional convolution filter refines the pixel values 240 in the magnified digital image 230. The two-dimensional convolution filter may improve the quality of the magnified digital image 230. The two-dimensional convolution filter may "smooth" the magnified digital image 230.

Figure 6:
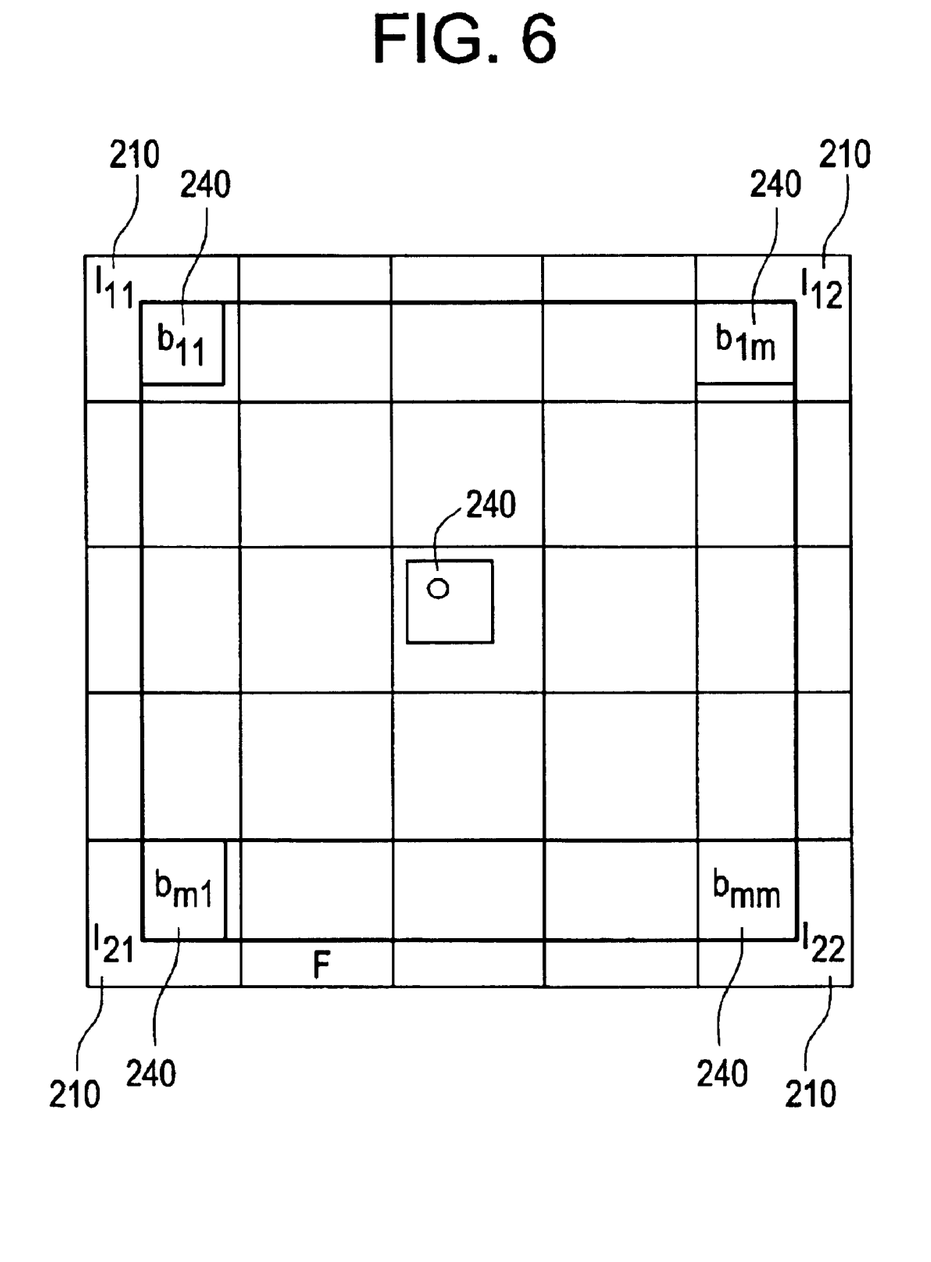
FIG. 6 illustrates a pixel scheme for applying a digital convolution filter to a bilinearly magnified image.

FIG. 6 illustrates a pixel scheme for applying a digital convolution filter to a bilinearly magnified image 230. $I_{ij}$ represent original digital image pixels 210; $b_{ij}$ represent bilinearly interpolated pixels 240; O represents an output pixel 240; and F represents a convolution filter area. Bilinearly interpolated values $b_{ij}$ may be calculated using equation (7) above for different d and e depending on pixel positions. The distances d and e represent the offsets of the bilinearly interpolated pixels 240 from the original image pixels 210.

An m by m convolution filter is then applied to the bilinearly interpolated pixels $b_{ij}$ (i,j=1, 2, ..., m) 240. The output pixel O 240 may be obtained using the following equation:

$$O = \sum_{i=1}^{m} \sum_{j=1}^{m} a_{ij}b_{ij}, \quad (8)$$

where $a_{ij}$ (i,j=1, ..., m) represent coefficients of the convolution filter.

Preferred embodiments of the present invention thus provide a method and apparatus for tissue dependent filtering for image magnification. The image magnification may take advantage of the quality of bicubic interpolation while utilizing the speed of bilinear interpolation and convolution.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of configuring an image magnification subsystem of a medical diagnostic imaging system, said image magnification subsystem being configured to perform image magnification using a first image magnification technique that approximates a second image magnification technique comprising bicubic interpolation, comprising:

obtaining at least one diagnostic image;

expanding said at least one diagnostic image based on the second image magnification technique comprising bicubic interpolation to form an intermediate image having a desired level of magnification; and calculating a set of coefficients for the first image magnification technique based on said intermediate image, said set of coefficients, when used with the first image magnification technique, yield a magnified image that substantially approximates the intermediate image formed by the second image magnification technique comprising bicubic interpolation.

2. The method of claim 1 wherein said first image magnification technique comprises bilinear interpolation.

3. The method of claim 1 wherein said set of coefficients comprises convolution filter coefficients.

4. The method of claim 1 further comprising storing said set of coefficients.

5. The method of claim 4 wherein said storing step further comprises storing said set of coefficients in association with said diagnostic image.

6. The method of claim 1 wherein said calculating step further comprises calculating a set of coefficients for the first image magnification technique based on said intermediate image and said diagnostic image, said set of coefficients, when used with the first image magnification technique, yield a magnified image that substantially approximates the intermediate image formed by the second image magnification technique.

7. The method of claim 1 wherein said calculating step further comprises using a function to calculate said set of coefficients.

8. The method of claim 7 wherein said calculating step further comprises minimizing said function to calculate said set of coefficients.

9. The method of claim 8 wherein said minimizing said function comprises minimizing said function using a simulated annealing method.

10. The method of claim 1 wherein said at least one diagnostic image comprises at least one diagnostic image representative of a particular anatomy.

11. The method of claim 1 wherein said at least one diagnostic image comprises at least one diagnostic image representative of a particular imaging modality.

12. The method of claim 1 wherein said at least one diagnostic image comprises at least one diagnostic image representative of a particular magnification value.

13. A medical diagnostic imaging system configured to perform image magnification using a first image magnification technique comprising bilinear interpolation that approximates a second image magnification technique, comprising:

a detector obtaining a diagnostic image;

a library storing at least one set of coefficients that, when used with the first image magnification technique comprising bilinear interpolation, yield a magnified image that substantially approximates an intermediate image formed by the second image magnification technique, said set of coefficients being uniquely associated with at least one parameter;

a selection unit identifying at least one parameter value for the diagnostic image and selecting a set of coefficients based on said identified at least one parameter; and a magnification unit magnifying the diagnostic image using the first image magnification technique comprising bilinear interpolation and the selected set of coefficients.

14. The system of claim 13 wherein said second image magnification technique comprises bicubic interpolation.

15. The system of claim 13 wherein said set of coefficients comprises convolution filter coefficients.

16. The system of claim 13 further comprising an output for outputting the magnified image.

17. The system of claim 15 wherein said output comprises a display.

18. The system of claim 15 wherein said output comprises a memory.

19. The system of claim 13 wherein said set of coefficients are calculated using at least one representative image.

20. The system of claim 19 wherein said at least one representative image comprises at least one diagnostic image representative of a particular anatomy.

21. The system of claim 19 wherein said at least one representative image comprises at least one diagnostic image representative of a particular imaging modality.

22. The system of claim 19 wherein said at least one representative image comprises at least one diagnostic image representative of a particular magnification value.

23. A method of configuring an image magnification subsystem of a medical diagnostic imaging system, said image magnification subsystem being configured to perform image magnification using a first image magnification technique comprising bilinear interpolation that approximates a second image magnification technique, said method comprising:

obtaining at least one diagnostic image;

expanding said at least one diagnostic image based on the second image magnification technique to form an intermediate image having a desired level of magnification; and calculating a set of coefficients for the bilinear interpolation based on said intermediate image, said set of coefficients, when used with the bilinear interpolation, yield a magnified image that substantially approximates the intermediate image formed by the second image magnification technique.

24. A medical diagnostic imaging system configured to perform image magnification using a first image magnification technique that approximates a second image magnification technique comprising bicubic interpolation, said system comprising:

a detector obtaining a diagnostic image;

a library storing at least one set of coefficients that, when used with the first image magnification technique, yield a magnified image that substantially approximates an intermediate image formed by the bicubic interpolation, said set of coefficients being uniquely associated with at least one parameter;

a selection unit identifying at least one parameter value for the diagnostic image and selecting a set of coefficients based on said identified at least one parameter; and a magnification unit magnifying the diagnostic image using the first image magnification technique and the selected set of coefficients.

* * * * *